United States Patent [19]
Wier

[11] 4,049,054
[45] Sept. 20, 1977

[54] STABLE MIXTURES OF POLYMERS AND SURFACTANTS FOR SURFACTANT FLOODING

[75] Inventor: Donald R. Wier, Bartlesville, Okla.

[73] Assignee: Phillips Petroleum Company, Bartlesville, Okla.

[21] Appl. No.: 730,773

[22] Filed: Oct. 8, 1976

Related U.S. Application Data

[63] Continuation-in-part of Ser. No. 531,158, Dec. 9, 1974, abandoned.

[51] Int. Cl.$^2$ .............................................. E21B 43/22
[52] U.S. Cl. ................................... 166/273; 166/275; 252/8.55 D
[58] Field of Search .............. 252/8.5 A, 8.5 C, 8.5 P, 252/8.55 R, 8.55 D; 166/273

[56] References Cited

U.S. PATENT DOCUMENTS

| | | | |
|---|---|---|---|
| 3,024,191 | 3/1962 | Jones | 252/8.55 |
| 3,373,808 | 3/1968 | Patton | 166/275 |
| 3,573,263 | 3/1971 | Gill | 260/79.3 |
| 3,739,848 | 6/1973 | Lawson et al. | 252/8.55 X |
| 3,768,560 | 10/1973 | Hill et al. | 166/274 |

OTHER PUBLICATIONS

Pursley et al., Paper SPE 3805 presented at the SPE Improved Oil Recovery Symposium, Tulsa, Okla., Apr. 16–19, 1972.

French et al., Paper SPE 3799 presented at the SPE Improved Oil Recovery Symposium, Tulsa, Okla., Apr. 16–19, 1972.

*Primary Examiner*—Herbert B. Guynn

[57] ABSTRACT

An improved fluid for surfactant flooding a subterranean oil-bearing reservoir is prepared by contacting polymer with fresh water in the substantial absence of a salt; thereafter combining the thus-formed polymer solution and a salt solution; and finally adding a surfactant.

12 Claims, No Drawings

STABLE MIXTURES OF POLYMERS AND SURFACTANTS FOR SURFACTANT FLOODING

CROSS-REFERENCE TO RELATED APPLICATIONS

This is a continuation-in-part of copending application Ser. No. 531,158 filed Dec. 9, 1974, now abandoned.

BACKGROUND OF THE INVENTION

This invention relates to surfactant flooding fluids for the recovery of petroleum from porous subterranean reservoirs.

The petroleum industry has long recognized that only a fraction of the original oil in a reservoir is expelled by natural mechanisms or primary production. Accordingly, there is a need for improved methods of increasing the ultimate yield of petroleum from natural reservoirs. Waterflooding is the most widely practiced secondary recovery method. In this method various additives can be added to the flood water to increase oil displacement. For instance a surfactant such as a petroleum sulfonate may be added to the water to lower the interfacial tension between oil and water. If enough surface active ingredient is added to lower the interfacial tension sufficiently, then more oil can be displayed from a rock by the water containing the surfactant than can be displaced by water not containing a surface active agent. If addition of a surface active agent lowers the interfacial tension to a value of 0.01 dynes per centimeter or lower, then for water containing the surface active agent will displace essentially all of the oil from most rocks. In contrast water not containing a surfactant will leave an oil saturation in the rock usually between 15 and 50 percent of the pore volume. Thus, the purpose of adding a surfactant such as a petroleum sulfonate to water is to increase the microscopic displacement of oil from the volume of the reservoir rock contacted by the water.

Another additive commonly employed in such fluids is a polymer. The purpose of adding polymer to the surfactant solution or dispersion is to decrease the mobility of the solution in the rock. This increases the volumetric sweep of the surfactant solution or in other words allows the solution to contact a much larger volume of the rock than it would without the polymer. The polymer also enhances the formation of an oil bank in front of the surfactant slug. Thus both surfactant and polymer are required to ensure both good microscopic and macroscopic (or volumetric) displacement of oil.

If a stable surfactant solution in which the surfactant will not precipitate with time is injected into a formation, the depth of penetration of the surfactant will depend upon the adsorption of the surfactant on the rock surface. If an unstable surfactant solution in which the surfactant will precipitate with time is injected into a formation, the depth of penetration of the surfactant will be less than that of a stable surfactant solution because the apparent adsorption will be higher due to precipitation of the surfactant.

SUMMARY OF THE INVENTION

It is an object of this invention to provide a stable surfactant flood solution containing both a surfactant and a polymer; it is a further object of this invention to provide an improved method of preparing surfactant flood fluids; and it is yet a further object of this invention to increase the recovery of petroleum from a subterranean deposit.

In accordance with this invention a polymer is dissolved in water in the substantial absence of a salt and thereafter a salt solution and finally a surfactant is incorporated into the fluid.

DESCRIPTION OF THE PREFERRED EMBODIMENTS

The polymer suitable for use in this invention can be any polymer which is effective in increasing the volumetric sweep (a mobility control agent) of the surfactant solution. Such polymers are known in the art, the preferred materials being acrylamide or methacrylamide copolymers, cellulose ethers such as CMC, and polysaccharides. Such polymers ar disclosed in Clampitt et al., U.S. Pat. No. 3,785,437, issued Jan. 15, 1974, the disclosure of which is hereby incorporated by reference. While the Clampitt el al. patent refers to gelled formulations, the same scope of polymer disclosed therein is suitable for the instant invention which is not a gelled formation. In accordance with the instant invention, no multivalent cation is utilized to crosslink the polymer.

Representative cellulose ethers which can be used in the practice of the present invention include, inter alia, the various carboxyalkyl cellulose ethers, e.g., carboxyethyl cellulose and carboxymethyl cellulose (CMC), mixed ethers such as carboxyalkyl hydroxyalkyl ethers, e.g., carboxymethyl hydroxyethyl cellulose (CMHEC), hydroxyalkyl celluloses such as hydroxyethyl cellulose and hydroxypropyl cellulose, alkylhydroxyalkyl celluloses such as methylhydroxypropyl cellulose, alkyl celluloses such as methyl cellulose, ethyl cellulose, and propyl cellulose, alkylcarboxyalkyl celluloses such as ethylcarboxymethyl cellulose, alkylalkyl celluloses such as methylethyl cellulose, and hydroxyalkylalkyl celluloses such as hydroxypropylmethyl cellulose, and the like.

Representative of the polysaccharides which can be used in forming the polymeric compositions of this invention are the heteropolysaccharides produced by fermentation of carbohydrates by bacteria of the genus Xanthomonas. Exemplary of such heteropolysaccharides are those produced by Xanthomonas compestris, Xanthomonas begonia, Xanthomonas phaseoli, Xanthomonas hederae, Xanthomonas incanae, Xanthomonas carotae, and Xanthomonas translucene. Of these, ionic polysaccharide B-1459 is peferred. The polysaccharide B-1459 is prepared by culturing the bacterium Xanthomonas campestris NRRL B-1459, U.S. Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28° C. Polysaccharide B-1459 is commercially available under the trade name of "Kelzan" from the Kelco Company, San Diego, Calif.

The copolymers of (A) acrylamide or methacrylamide and (B) an alkali metal or ammonium salt of acrylic acid or methacrylic acid can be prepared as disclosed in U.S. Pat. No. 3,573,263, the disclosure of which is hereby incorporated by reference. Preferred is a 5-40 percent anionic copolymer of acrylamide and sodium acrylate.

The concentration of polymer will generally be in the range of 0.01 to 5 weight percent, preferably 0.05 to 0.3 weight percent based on the total weight of the surfactant flood fluid (polymer, salt, surfactant, and water).

The salt used in the surfactant flood fluid of this invention can be any salt normally used in waterflood applications. The preferred salts are sodium chloride (NaCl) and sulfate salts. Suitable sulfate salts are disclosed in Patton, U.S. Pat. No. 3,373,808, issued Mar. 19, 1968, the disclosure of which is hereby incorporated by reference. Of the sulfate salts, sodium sulfate ($Na_2SO_4$) is preferred.

The concentration of the salt will generally be within the range of 0.1 to 10, preferably 0.5 to 5 weight percent based on the total weight of the surfactant flood fluid (polymer, salt, surfactant, and water).

It is essential to the invention that the salt and polymer be formulated into an aqueous solution prior to contact with the surfactant. Most preferably the polymer is first dissolved in fresh water and thereafter the fresh water-polymer solution is mixed with a salt solution. At this point the concentration of the fresh water-polymer solution can vary greatly as can the concentration of the salt solution with additional fresh water being added to bring the concentration of the final surfactant flood fluid within the ranges set out hereinabove. It is desirable to have the polymer solution and the salt solution mixed until the combined solution is essentially homogeneous prior to contact with the surfactant solution.

The surfactant can be any anionic surfactant known in the art for use in surfactant flood applications. The preferred materials are those known as petroleum sulfonates. Either the water-soluble green soaps or the oil-soluble mahogany sulfonates can be used. These may form true solutions or simply form dispersions in the surfactant flood fluid. Suitable pertroleum sulfonates are disclosed in said Patton U.S. Pat. No. 3,373,808. These materials are commercially available from numerous sources as disclosed in Hill et al., U.S. Pat. No. 3,768,560, issued Oct. 30, 1973, the disclosure of which is hereby incorporated by reference.

The concentration of the surfactant will generally be within the range of 0.01 to 10, preferably 0.5 to 5 weight percent based on the total weight of the surfactant flood fluid (polymer, slt, surfactant, and water).

It is essential that the polymer-salt solution be thoroughly mixed with the surfactant. Accordingly, mixing times of up to 100 hours may be employed. Depending on the efficiency of the mixing system, times of 0.1 to 200, preferably 0.2 to 30 hours are satisfactory.

The surfactant flood fluid of this invention can be used in the same manner as similar fluids of the prior art. For instance, a preflush can be introduced into an injection well followed by the surfactant flood solution of this invention followed by a tapered buffer (for instance a polymer dissolved in water) finally followed by a drive fluid such as salt water to displace the surfactant flood fluid of this invention toward a production means. Crude oil displaced by these injected fluids is recovered at the production well.

The surfactant flood fluid of this invention can contain in addition conventional additives such as builders (sodium carbonate or sodium tripolyphosphate and the like).

EXAMPLE

The experiments to be described hereinbelow show that if polymer-salt-surfactant-water solutions are mixed in a certain order more stable solutions are obtained than if the four components are mixed in other orders. An indication of the stability of the solutions was obtained by (1) mixing the solutions; (2) allowing them to stand undisturbed for different periods of time; and (3) by either measuring the percentage of the original sulfonate remaining in solution after different periods of time or by observing the amount of precipitate in the bottom of the container.

The first group of experiments were made using solutions which contained 1.0 weight percent active petroleum sulfonate, Petronate — from Witco, 750 ppm Polyfloc 1110, (about 20 percent anionic high molecular weight, about $7.8 \times 10^6$, copolymer of acrylamide and sodium acrylate made in accordance with U.S. Pat. No. 3,573,263), 1.0 weight percent NaCl, and water. The solutions were prepared by mixing with water three different solutions one of which contained 3.33 weight percent active petroleum sulfonate in water, another which contained 2500 ppm Polyfloc 1110 in water, and another which contained 10.0 weight NaCl in water. The final solutions were prepared by mixing the three different concentrated solutions and water in four different orders. The mixing procedures used were in the order listed except for B in which all of the ingredients were simultaneously mixed:

Mixing Procedure A: (Invention)

1. 60.0 g. of 2500 ppm polymer solution.
2. 24.0 g. of 10 percent NaCl solution.
3. 56.0 g. of distilled water.
4. Stir until homogeneous, then add.
5. 60.0 g. of 3.33 percent active petroleum sulfonate solution.
6. Stir (some runs were stirred for 24 hours and others for 168 hours as noted in the table following).

Mixing Procedure B: (Simultaneous Mixing)

1. 60.0 g. of 2500 ppm polymer solution.
2. 60.0 g. of 3.33 percent active petroleum sulfonate solution.
3. 56.0 g. of distilled water.
4. 24.0 g. of 10 percent NaCl solution.
5. Stir for 24 or 168 hours.

Mixing Procedure C: (Polymer and salt not premixed prior to contact with surfactant)

1. 60.0 g. of 3.33 percent active petroleum sulfonate solution.
2. 56.0 g. of distilled water.
3. 24.0 g. of 10 percent NaCl solution.
4. Stir until homogeneous.
5. 60.0 g. of 2500 ppm polymer solution.
6. Stir for 24 or 168 hours.

Mixing Procedure D: (Polymer and salt not premixed prior to contact with surfactant)

1. 60.0 g. of 2500 ppm polymer solution.
2. 60.0 g. of 3.33 percent active petroleum sulfonate solution.
3. 56.0 g. of distilled water.
4. Stir until homogeneous.
5. 24.0 g. of 10 percent NaCl solution.
6. Stir for 24 or 168 hours.

Mixing Procedure E: (No polymer)
1. 60.0 g. of 3.33 percent active petroleum sulfonate solution.
2. 24.0 g. of 10 percent NaCl solution.
3. 116 g. of distilled water.
4. 0 g. of 2500 ppm polymer solution.
5. Stir for 24 or 168 hours.

The solutions in flasks were stirred on a magnetic stirplate for either 24 or 168 hours after addition of the last ingredient. Following the stirring period 14 milliliter samples of the solutions were poured into long slim tubes and allowed to set undisturbed for a desired period of time. The depth of the solutions in the tubes was about 21.0 centimeters. At the end of the desired settling time 2.5 g. samples were removed from the top of the tubes and the quantities of sulfonate in the samples were determined by a titration technique. The flasks in which the solutions were stirred were shaken vigorously and 2.5 g. samples were removed and titrated also in order to determine the sulfonate concentrations before any settling occurred.

In the first group of experiments the equivalent weight of the sulfonates used were 380, 400, 410 and 420, stirring times of 1 and 7 days were used, and settling times were varied from 6 to 19 days. The results of the experiments are given in Table I. The results show that in each of the seven experiments mixing procedure A gave solutions which were as stable as, or more stable than, any of the other solutions which contained polymer. Thus, the results show conclusively that mixing procedure A is superior to the other three mixing procedures.

of settlement in the bottom of the tube. Thus, in the remaining experiments an indication of the stability of the solutions was obtained by observing the level of settlement in the bottom of the tubes after they had set the desired period of time.

In the remaining experiments all of the solutions contained 1.0 percent active petroleum sulfonate, 750 ppm polymer, and 1.0 percent NaCl. In the experiments four different polymers were investigated and sulfonates having two different equivalent weights were used. The mixing procedures investigated were A, B, and C. A 24 hour stirring time was used for all of the solutions. The results of the experiments are given in Tables II and III.

TABLE II

Results for solutions containing sulfonate which had an equivalent weight of 410.

| Polymer | Mixing Procedure | Settling Time = 1 day | Settling Time = 2 days | Settling Time = 8 days | Settling Time = 29 days |
|---|---|---|---|---|---|
| Dow Pusher 700 | A | None | None | None | None |
| (polyacrylamide homopolymer, | B | .05 | .05 | .2 | .2 |
| 20–30 percent hydrolyzed) | C | None | None | None | None |
| Kelzan MF | A | .05 | —$^x$ | — | — |
| (polysaccharide) | B | .45 | — | — | — |
|  | C | .10 | — | — | — |
| Carboxymethyl cellulose | A | None | None | None | None |
|  | B | ≈.01 | .05 | .05 | .05 |
|  | C | None | ≈.01 | ≈.01 | ≈.01 |
| Polyfloc 1110 | A | None | None | None | None |
| (a copolymer of acrylamide) | B | .05 | .05 | .05 | .05 |
|  | C | ≈.01 | ≈.01 | ≈.01 | ≈.01 |

$^x$No further readings because of high settling at one day.

TABLE III

Results for solutions containing sulfonate which had an equivalent weight of 430.

| Polymer | Mixing Procedure | Settling Time = 1 day | Settling Time = 4 days |
|---|---|---|---|
| Dow Pusher 700 | A | ≈.01 | .10 |
| (polyacrylamide) | B | ≈.01 | .15 |
|  | C | None | None |
| Kelzan MF | A | None | .5 |
| (polysaccharide) | B | ≈.01 | 1.5 |
|  | C | ≈.01 | 1.6 |
| Carboxymethyl cellulose | A | None | .1 |
|  | B | ≈.01 | .15 |
|  | C | ≈.01 | .15 |
| Polyfloc 1110 | A | None | ≈.01 |
| (a copolymer of | B | ≈.01 | .1 |
| acrylamide) | C | ≈.01 | .25 |

The results show that for solutions containing Kelzan MF, carboxymethyl cellulose, and Polyfloc 1110 that

TABLE I

| Exp. No. | Approx. Ave. Equiv. Wt. of Sulfonate | Stirring time, days | Settling time, days | Percent of the sulfonate remaining in solution at end of settling time. | | | | |
|---|---|---|---|---|---|---|---|---|
| | | | | Mixing Procdr. A | Mixing Procdr. B | Mixing Procdr. C | Mixing Procdr. D | Mixing Procdr. E (no polymer) |
| 1 | 380 | 1 | 9 | 99.6 | 98.2 | 98.3 | 99.1 | 99.4 |
| 2 | 400 | 1 | 9 | 99.1 | 97.7 | 92.1 | 93.7 | 101.3 |
| 3A | 410 | 1 | 6 | 97.0 | 90.3 | 94.9 | 94.8 | 99.8 |
| 3B | 410 | 1 | 19 | 97.0 | 89.9 | 93.9 | 93.3 | 100.4 |
| 3C | 410 | 7 | 12 | 101.1 | 99.6 | 100.9 | 99.1 | 100.4 |
| 4A | 420 | 1 | 8 | 99.0 | 95.1 | 86.7 | 93.0 | 100.5 |
| 4B | 420 | 7 | 8 | 98.4 | 98.1 | 92.6 | 95.0 | 98.8 |
| Average over all experiments | | | | 98.7 | 95.6 | 94.2 | 95.4 | 100.1 |

As can be seen in all of the runs containing polymer, procedure A gave the best results with essentially all of the sulfonate remaining in solution even after 6–19 days.

In the process of collecting the data given in Table I, it was observed that a correlation existed between the quantity of sulfonate remaining in solution and the level mixing procedure A in all cases gave solutions which were as stable as or more stable than solutions prepared by mixing procedures B and C. For the solutions containing Dow Pusher 700 and 410 equivalent weight sulfonate mixing procedure A was in all cases superior to B and was equal in all cases to C. For the solutions containing Dow Pusher 700 and 430 equivalent weight sulfonate mixing procedure A was superior to B in both cases but inferior to C in both cases. The reason for this anomaly with the homopolymer of acrylamide is not understood but it does not detract from the overall statistical superiority of procedure A.

The results of these experiments indicate that mixing procedure A is the most desirable way to mix polymer, sulfonate and salt for a surfactant flooding operation. In a field operation, the desirable way to prepare a polymer-salt-surfactant mixture for injection would be:

1. Dissolve polymer in fresh water.
2. Prepare a salt solution by dissolving a salt in fresh water or by mixing fresh water with a brine.
3. Add the desired amount of salt solution to the polymer solution and mix.
4. Dissolve surfactant in fresh water.
5. Add surfactant solution to the polymer-salt solution and mix.
6. Inject.

While this invention has been described in detail for the purpose of illustration, it is not to be construed as limited thereby but is intended to cover all changes and modifications within the spirit and scope thereof.

I claim:

1. A method of preparing a stable surfactant waterflooding fluid comprising:
   dissolving a polymer selected from the group consisting of a high molecular weight copolymer of acrylamide or methacrylamide with an alkali metal or ammonium salt of acrylic or methacrylic acid, carboxymethyl cellulose, or a heteropolysaccharide produced by fermentation of carbohydrates by bacteria of the genus Xanthomonas in water;
   thereafter combining said thus-formed polymer solution and a solution of a salt selected from the group consisting of sodium chloride and sulfate salts in the absence of a petroleum sulfonate surfactant and mixing thoroughly; and
   thereafter combining said thus-formed mixture with a petroleum sulfonate surfactant and mixing until a homogeneous fluid is obtained,
   said polymer being present in an amount within the range of 0.01 to 5 weight percent based on the weight of said fluid, said salt being present in an amount within the range of 0.1 to 10 weight percent based on the weight of said fluid, and said surfactant being present in an amount within the range of 0.01 to 10 weight percent based on the weight of said fluid.

2. A method according to claim 1 wherein said salt is sodium chloride or sodium sulfate.

3. A method according to claim 1 wherein said petroleum sulfonate has an equivalent weight of about 410.

4. A method according to claim 1 wherein said polymer is present in an amount within the range of 0.05 to 0.3 weight percent based on the total weight of said fluid, said salt is present in an amount within the range of 0.5 to 5 weight percent based on the weight of said fluid, and said surfactant is present in an amount within the range of 0.5 to 5 weight percent based on the weight of said fluid.

5. A method according to claim 1 wherein said polymer is a heteropolysaccharide produced by fermentation of carbohydrates by bacteria of the genus Xanthomonas.

6. A method according to claim 1 wherein said mixing of said combined polymer solution and salt solution with said surfactant is carried out for a time within the range of 0.1 to 200 hours.

7. A method according to claim 1 wherein said polymer is carboxymethyl cellulose.

8. A method according to claim 1 wherein said polymer is a copolymer of acrylamide and sodium acrylate.

9. A method according to claim 8 wherein said salt is sodium chloride or sodium sulfate.

10. A method according to claim 8 wherein said polymer is present in an amount within the range of 0.05 to 0.3 weight percent based on the weight of said fluid, said salt is present in an amount within the range of 0.5 to 5 weight percent based on the weight of said fluid, and said surfactant is present in an amount within the range of 0.5 to 5 weight percent based on the weight of said fluid.

11. A process for recovering crude oil from an oil-bearing subterranean formation having at least one injection means in fluid communication with at least one production means, comprising: injecting into the formation a surfactant waterflooding fluid made by:
   dissolving a polymer selected from the group consisting of a high molecular weight copolymer of acrylamide and sodium acrylate, carboxymethyl cellulose, or a heteropolysaccharide produced by fermentation of carbohydrates by bacteria of the genus xanthomonas in fresh water;
   thereafter combining said thus-formed polymer solution and a solution of a salt selected from the group consisting of sodium chloride and sulfate salts in the absence of a petroleum sulfonate surfactant and mixing thoroughly; and
   thereafter combining said thus-formed mixture with a petroleum sulfonate surfactant and mixing until a homogeneous fluid is obtained;
   said polymer being present in an amount within the range of 0.01 to 5 weight percent based on the weight of the fluid, said salt being present in the range of 0.1 to 10 weight percent based on the weight of said fluid, and said surfactant being present in an amount within the range of 0.01 to 10 weight percent based on the weight of said fluid; and
   displacing said fluid toward said production means to recover said crude oil.

12. A method according to claim 11 wherein a preflush is introduced into said injection means prior to introduction of said fluid and wherein said fluid is followed by a buffer and thereafter by a drive fluid.

* * * * *